US008816202B2

(12) United States Patent
Burton

(10) Patent No.: US 8,816,202 B2

(45) Date of Patent: Aug. 26, 2014

(54) SHAPE-HOLDING ELECTRICAL CORD

(76) Inventor: Jason Burton, Baltimore, MD (US)

( * ) Notice: Subject to any disclaimer, the term of this patent is extended or adjusted under 35 U.S.C. 154(b) by 75 days.

(21) Appl. No.: 13/475,032

(22) Filed: May 18, 2012

(65) Prior Publication Data

US 2013/0306372 A1 Nov. 21, 2013

(51) Int. Cl.
*H02G 3/04* (2006.01)

(52) U.S. Cl.
USPC ....... 174/68.1; 174/72 A; 174/135; 174/74 R; 248/49

(58) Field of Classification Search
USPC .... 174/72 A, 84 R, 135, 138 G, 36, 34, 88 R, 174/68.1, 68.3, 70 C, 494; 248/49, 74.1, 248/68.1; 439/501, 502, 214, 650
See application file for complete search history.

(56) References Cited

U.S. PATENT DOCUMENTS

| | | | | |
|---|---|---|---|---|
| 4,739,801 A | | 4/1988 | Kimura et al. | |
| 5,461,200 A | * | 10/1995 | Norcia | 174/135 |
| 5,577,932 A | * | 11/1996 | Palmer | 439/501 |
| 5,658,158 A | * | 8/1997 | Milan | 439/214 |
| 5,848,915 A | * | 12/1998 | Canizales | 439/650 |
| 5,906,507 A | * | 5/1999 | Howard | 439/501 |
| 5,909,007 A | | 6/1999 | Norholmen | |
| 6,603,076 B2 | | 8/2003 | Doshita et al. | |
| 6,826,837 B2 | | 12/2004 | Todd | |
| 6,844,494 B1 | * | 1/2005 | Nevins | 174/53 |
| 7,442,090 B2 | * | 10/2008 | Mori et al. | 174/53 |
| 7,607,928 B2 | * | 10/2009 | Schriefer et al. | 439/214 |
| 8,399,769 B2 | * | 3/2013 | Doll | 174/135 |
| 2007/0034400 A1 | * | 2/2007 | Rivera | 174/138 G |
| 2008/0250632 A1 | * | 10/2008 | Dayton et al. | 174/84 R |
| 2012/0125683 A1 | * | 5/2012 | Mabuchi | 174/72 A |

* cited by examiner

*Primary Examiner* — Angel R Estrada

(74) *Attorney, Agent, or Firm* — Crossley Patent Law; Micah C. Gunn

(57) ABSTRACT

A shape-holding electrical cord including a bendable, pliable, nonconductive, insulating sheath surrounding at least one shape-holding wire, said shape-holding wire disposed between a first end and a second end, and a conducting wire disposed therebetween, the conducting wire insulated from each shape-holding wire, wherein the first end is connected to a male plug and the second end is connected to a power strip and alternately a female plug, whereby the shape-holding electrical cord is bendable to conform to a desired placement path between an extant power outlet and an extant electronic appliance having a plug to which the shape-holding electrical cord is interconnectable.

1 Claim, 2 Drawing Sheets

SHAPE-HOLDING ELECTRICAL CORD

BACKGROUND OF THE INVENTION

Various types of shape-holding electrical cords are known in the prior art. However, what is needed is a shape-holding electrical cord that includes a bendable, pliable, nonconductive, insulating sheath surrounding at least one shape-holding wire, said shape-holding wire disposed between a first end and a second end, and a conducting wire disposed therebetween, wherein the first end is connected to a male plug and the second end is connected to a power strip and alternately a female plug, whereby the shape-holding electrical cord is bendable to conform to a desired placement path between an extant power outlet and an extant electronic appliance to which appliance the shape-holding electrical cord is thereby interconnectable.

FIELD OF THE INVENTION

The present invention relates to a shape-holding electrical cord, and more particularly, to a shape-holding electrical cord including a bendable, pliable, nonconductive, insulating sheath surrounding at least one shape-holding wire, said shape-holding wire disposed between a first end and a second end, and a conducting wire disposed therebetween, wherein the first end is connected to a male plug and the second end is connected to a power strip and alternately a female plug, whereby the shape-holding electrical cord is bendable to conform to a desired placement path between an extant power outlet and an extant electronic appliance to which appliance the shape-holding electrical cord is thereby interconnectable.

SUMMARY OF THE INVENTION

The general purpose of the shape-holding electrical cord, described subsequently in greater detail, is to provide a shape-holding electrical cord which has many novel features that result in a shape-holding electrical cord which is not anticipated, rendered obvious, suggested, or even implied by prior art, either alone or in combination thereof.

Extant electrical cords of the present age are typically comprised of conductors disposed within an insulating sheath, without shape-holding properties. As such, electrical cords are oftentimes secured in place by means of fasteners, nails, ties, tape, and other fastening devices used to conform an electrical cord to a desired path between a power outlet and a desired location for interconnecting a number of appliances thereto. Electrical cords are often left hanging, unsecured, or untidily arranged across a floor, room, or other path between a power outlet and a desired location for interconnecting a number of appliances. Such electrical cords are unsightly and potentially hazardous—a person can easily trip, causing damage to an appliance (dragged to the floor by the snagged electrical cord), the home or surface (when said appliance topples), or to the person (tumbling after tripping). Moreover, since an electrical cord is used to conduct electricity to an appliance, tripping on an electrical cord can constitute a fire hazard, or even cause a lethal accident.

The present invention, therefore, has been devised to more conveniently, safely, and tidily store an electrical cord conformed along a particular path in position between a power outlet and a desired location for interconnecting a number of appliances thereto. Because the present shape-holding electrical cord holds a shape to which it is bent, the present shape-holding electrical cord conforms to a path it is positioned along and may be readily conformed to a path lying along a wall, say, around a corner, even, whereby it maintains a right angle to remain flush with said wall.

The present shape-holding electrical cord includes a pliable, nonconductive insulating sheath disposed around at least one shape-holding wire. A conducting wire is disposed within the sheath, said conducting wire insulated from the at least one shape holding wire within the sheath. A male plug is disposed at a first end of the present shape-holding electrical cord to interconnect said shape-holding electrical cord with an extant power outlet. A power strip is disposed at a second end of the present shape-holding electrical cord for interconnecting appliances thereto. An alternate embodiment is disclosed therein wherein a female plug is disposed at the second end in place of the power strip.

An electronic appliance may therefore be readily interconnected with the instant shape-holding electrical cord, and said shape-holding electrical cord tidily positioned to conform to a desired path between an extant power outlet and a location proximal to said appliance whereby the shape-holding electrical cord is positional neatly, safely, and readily maintained along said path without the need of a plurality of fasteners.

Thus has been broadly outlined the more important features of the present shape-holding electrical cord so that the detailed description thereof that follows may be better understood and in order that the present contribution to the art may be better appreciated.

Objects of the present shape-holding electrical cord, along with various novel features that characterize the invention are particularly pointed out in the claims forming a part of this disclosure. For better understanding of the shape-holding electrical cord, its operating advantages and specific objects attained by its uses, refer to the accompanying drawings and description.

BRIEF DESCRIPTION OF THE DRAWINGS FIGURES

DETAILED DESCRIPTION OF THE DRAWINGS

Figure 1:
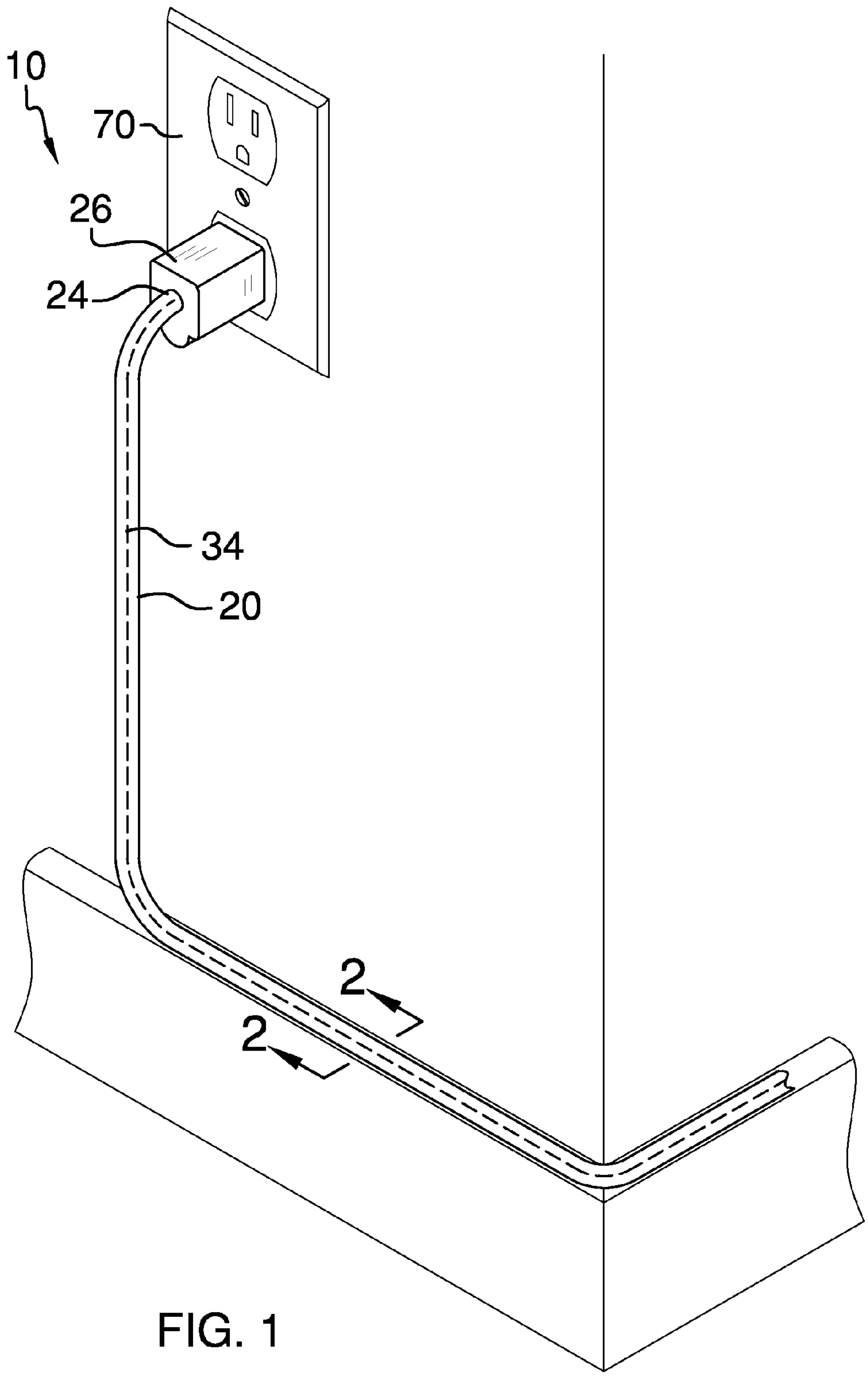
FIG. 1 is an in-use view.
Figure 2:
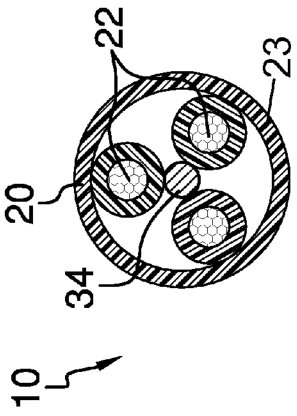
FIG. 2 is a cross-section view taken along the line 2-2 of FIG. 1.
Figure 3:
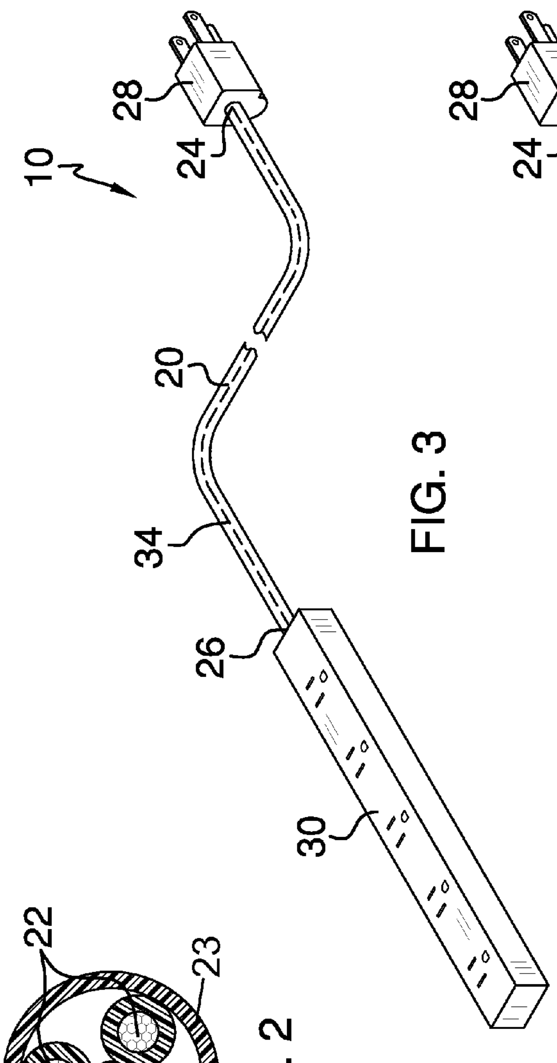
FIG. 3 is an isometric view of a shape-holding electrical cord used with an electrical strip.
Figure 4:
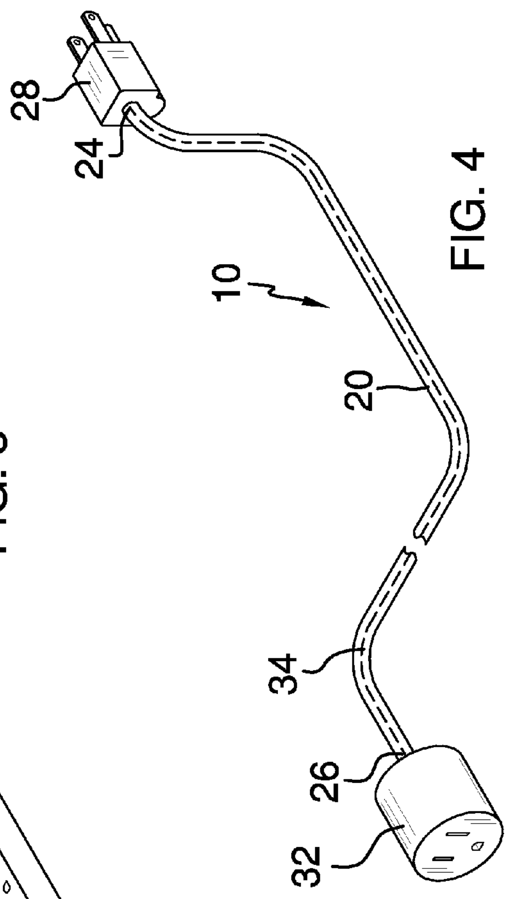
FIG. 4 is an isometric view of the shape-holding electrical cord used with an electrical plug.

With reference now to the drawings, and in particular FIGS. 1 through 4 thereof, example of the instant shape-holding electrical cord employing the principles and concepts of the present shape-holding electrical cord and generally designated by the reference number 10 will be described.

Referring to FIGS. 1 through 4 a preferred embodiment of the present shape-holding electrical cord 10 is illustrated.

The term "shape-holding" as used in this specification is taken to mean pliable, tractable, and yet rigid in maintaining a shape once bent to conform to said shape. Thusly, the instant shape-holding electrical cord 10 is able to be bent, and remain in a configuration such as a right angle, for example, or an arc of a circle, say, as desired when positioning said shape-holding electrical cord 10 between an extant power outlet 70 and a device with which said shape-holding electrical cord 10 is to be interconnected, until said shape-holding electrical cord 10 is bent again, as desired.

The shape-holding electrical cord 10 includes a bendable, pliable, nonconductive, insulating sheath 20 surrounding a triad of shape-holding wires 22, said shape-holding wire 22 disposed between a first end 24 and a second end 26, and a conducting wire 34 centrally disposed between the shape-holding wires 22 in a position between the first end 24 and the second end 26, wherein the first end 24 is connected to a male plug 28 and the second end 26 is connected to a power strip 30 (see FIG. 3) and alternately a female plug 32 (see FIG. 4), whereby the shape-holding electrical cord 10 is bendable to conform to a desired placement path between an extant power outlet 70 and an extant electronic item (not shown) having a male plug with which the shape-holding electrical cord 10 is thereby interconnectable. An insulation wrap 23 is continuously disposed around each of the shape-holdinq wires 22.

The present shape-holding electrical cord 10 is therefore positional along a desired path between an extant power outlet 70 and a desired location for interconnecting extant appliances, as desired. The shape-holding properties of the at least one shape-holding wire 22 enables said shape-holding electrical cord 10 to be tidily positioned against a wall, for example, or around a corner (as shown in FIG. 1). The shape-holding electrical cord 10 readily conforms to the path it is positioned along, and maintains the shape of said path until re-bent, as desired.

What is claimed is:

1. A shape-holding electrical cord consisting of:

a bendable, pliable, nonconductive, insulating sheath;

a triad of spaced apart shape-holding wires, wherein the sheath surround the shape-holding wires;

wherein the shape-holding wire is disposed between a first end and a second end;

a conducting wire centrally disposed between the shape-holding wires in a position between the first end and the second end;

an insulation wrap continuously disposed around each of the shape-holding wires;

wherein the first end is connected to a male plug and the second end is connected to a power strip, whereby the shape-holding electrical cord is bendable to conform to a desired placement path between an extant power outlet and an extant electronic appliance having a plug to which the shape-holding electrical cord is interconnectable; and wherein the conducting wire is insulated from each shape-holding wires.

* * * * *